No. 608,625. Patented Aug. 9, 1898.
F. H. RICHARDS.
UNIVERSAL JOINT.
(Application filed Nov. 29, 1897.)

(No Model.)

Witnesses:
O. W. Smith
Fred. J. Dole

Inventor:
F. H. Richards

UNITED STATES PATENT OFFICE.

FRANCIS H. RICHARDS, OF HARTFORD, CONNECTICUT.

UNIVERSAL JOINT.

SPECIFICATION forming part of Letters Patent No. 608,625, dated August 9, 1898.

Application filed November 29, 1897. Serial No. 660,116. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Universal Joints, of which the following is a specification.

This invention relates to improvements in universal joints; and it has for its main object the provision of an improved safety-coupling by means of which two rotary members may be connected for movement in unison while having free play with respect to each other in angular direction.

One of the main objects of the invention is to provide an improved device of this type in which the spherical journal member of the joint or coupling shall form a substantially unitary part of the joint and be cut away to the least possible extent, thereby assuring the greatest possible strength and most perfect solidity of construction in a coupling of any given size.

More particularly the essential feature of this invention is the employment, in connection with a suitable coupling-head having a divided bearing member, of a journal member or spherical center having a long recess in the journal-surface thereof of a depth sufficient to permit the journal member or socket to be inserted between the divided ends of the bearing member and slipped into place.

In the preferred construction, which is illustrated herein, the universal joint embodies three members, two of which are in the form of coupling members, each of which has a divided bearing member or ring, these two bearing members coöperating with a third or journal member in the form of a spherical center, having meridian grooves crossing on the polar centers of the spherical journal member, and also having a pair of concave grooves disposed substantially diametrically opposite each other and formed in the back walls of the two meridian grooves of the spherical member, the construction of the parts and the depth of the concave grooves being such that the two bearing members may be slipped into position and seated, one after the other, in the channels formed by the meridian grooves in the spherical center or journal member.

A feature of the invention which I deem of importance, as constituting a means for facilitating the assembling of the parts and for preventing accidental disassembling of the members, is the employment of a spherical journal member or center having meridian grooves, at least one of which is of different depths at substantially diametrically opposite points thereof.

Figure 1:
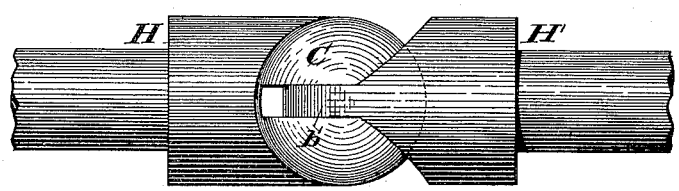
Figure 2:
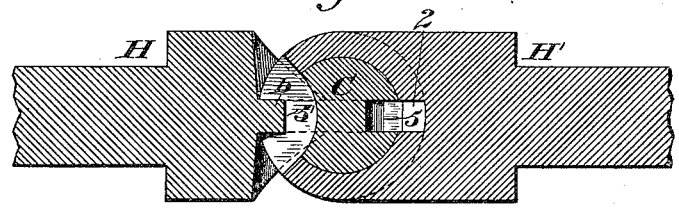
Figure 3:
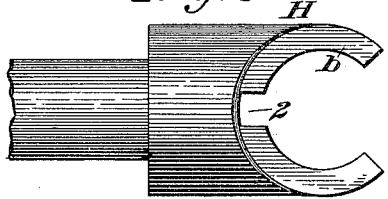
Figure 4:
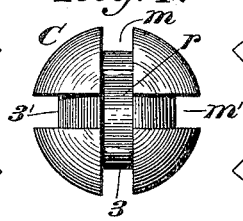
Figure 5:
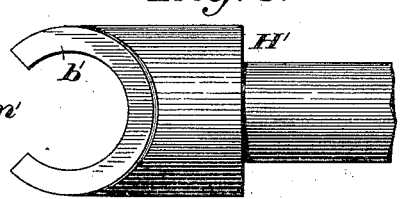
Figure 6:
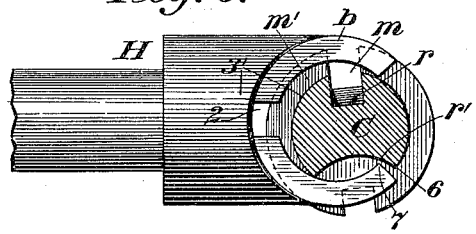
Figure 7:
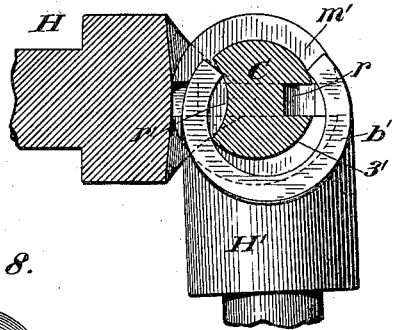
Figure 8:
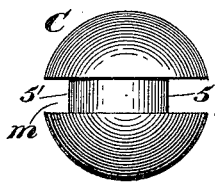

In the drawings accompanying and forming part of this specification, Figure 1 is a side elevation illustrating a universal joint or coupling constructed in accordance with my present improvements. Fig. 2 is a central longitudinal section of the same. Fig. 3 is a side elevation of one of the coupling-heads carrying a bearing member. Fig. 4 is a polar end elevation of the spherical journal member or center. Fig. 5 is a view similar to Fig. 3 of the other coupling-head, having a bearing member. Fig. 6 is a sectional side elevation illustrating the manner in which the first bearing member is slipped into place in one of the meridian grooves of the journal member. Fig. 7 is a similar view illustrating the manner in which the second bearing member is placed into position, and Fig. 8 is an equatorial side elevation of the spherical center.

Similar characters designate like parts in all the figures of the drawings.

The universal joint or coupling embodying my present invention comprises, in the construction illustrated herein, three members, two of which I will designate herein as "bearing" members and the third as a "journal" member. As to many of the features thereof the two bearing members may be of any well-known or suitable construction, and they will of course be formed integral with or constructed for attachment to some suitable rotatable members, one of which will constitute a driving and the other a driven member.

Ordinarily the bearing members will form parts of coupling-heads, such as those indicated herein by H and H', the bearing member of the coupling-head H being designated herein by *b* and that of the coupling-head H' by *b'*. Preferably the two bearing members will be substantially in the form of rings divided at those ends thereof which are intended to receive the journal member or spherical center, these two bearing members having, in the preferred construction illustrated herein, flat sides lying in parallel planes, although this is not essential. One of the bearing-rings, in this case that indicated by $b$, may also have a transverse groove or recess, such as 2, for a purpose which will be hereinafter more fully set forth.

It will be noticed that both of the coupling-heads are cut away in the usual manner to provide the necessary clearance and permit the driving and the driven members to turn at a relatively large angle with respect to each other.

The journal member, in which the present improvements principally reside, is, as to some of the features thereof, similar to the journal members or sockets employed in couplings or joints of this type as heretofore constructed. It will usually have a pair of meridian grooves crossing at the polar centers of the spherical member, these grooves having side walls or bearing-surfaces of a shape adapted to coöperate with the flat bearing-surfaces of the bearing members $b$ and $b'$. Hence in this instance the bearing-faces of each meridian groove will lie in parallel planes. Two meridian grooves of this type are indicated herein by $m$ and $m'$ and are preferably substantially similar in all respects as to size, depth, &c., although for the purpose of setting forth clearly the construction and use thereof they will be indicated herein by separate reference characters.

It will be obvious that the journal-surfaces 3 and 3', which form the back walls of the meridian grooves $m$ and $m'$, are adapted to coöperate with the corresponding journal-surfaces of the bearing-rings $b$ and $b'$, and hence these journal-surfaces of all the parts are of the same diameter. It will be clear, therefore, that it will be impossible to insert the bearing-rings $b$ and $b'$ in place if no other means is provided for permitting the assembling of the parts than those features which have already been described, as the openings between the divided ends of the two bearing-rings are of smaller diameter than the diameters of the respective journal-surfaces 3 and 3', with which the bearing-rings are intended to coöperate. Obviously some other means must be provided for permitting the bearing-rings to be slipped into place if the arms of the divided rings are not to be spread prior to the assembling of the parts. In this case it is not intended that these arms shall be spread, as such spreading has many disadvantages, not the least of which is that when so spread it is extremely difficult to bring the divided parts of the rings back to their original positions and present perfect journal-surfaces to coact with those on the spherical journal member. Of course the assembling of the parts might be effected by removing or slabbing off enough of the journal-surfaces 3 and 3' to permit the bearing-rings to be slipped over such cut-away portions of the sphere; but this necessitates the removal of a very large portion of the spherical center or journal member and the consequent weakening of the joint.

It is one of the aims of this invention to provide a construction in which it will be necessary neither to spread the arms of the bearing-rings nor to cut away a large portion of the spherical center before the parts can be assembled, and in the construction illustrated herein I have shown a sphere (designated in a general way by C) having in one or more journal-surfaces thereof a recess or recesses of relatively considerable length and of such depth as to permit the bearing member to be readily slipped around the spherical center without cutting away any more of the latter than is absolutely necessary to assure the proper connection of the parts. Although this recess may be variously modified within the scope of my invention, I prefer to employ one in the form of a concavity or long concaved groove located in a journal-surface of the sphere, and hence, in the construction shown, formed in the back wall of a meridian groove. Preferably, of course, two such long recesses or grooves will be used, one for each of the two meridian grooves $m$ and $m'$, these concaved grooves or recesses being indicated herein by $r$ and $r'$. Each of these grooves or recesses will be located usually at a polar center of the sphere C, the two concavities being preferably diametrically opposite and disposed transversely to each other for reasons which will be apparent. In addition to each of these concavities forming a means for permitting the assembling of the sphere and one of the bearing members it will be clear that the other concavity provides an additional recess which will facilitate the introduction of the bearing member into its proper meridian groove.

By positioning the two concaved grooves in the manner just described I obtain still another result, as will be clear by referring more particularly to Fig. 8. It will be obvious from this view that there are points in each of the meridian grooves where the groove is of different depths, and these different depths are at points diametrically opposite each other. The difference in the depth of the grooves at the two points is indicated clearly at 5 and 5' and in the construction illustrated is due entirely to the positioning of the two concavities $r$ and $r'$, which, it should be understood, are preferably substantially similar in extent and depth.

In assembling the several parts the spherical center C is first turned to the position shown in Fig. 6, when, as will be apparent, it may be slipped readily into place, and it should be noted here that the coupling-head H is the one which is coupled first to the spherical center. After the sphere is in place in the bearing member $b$ said sphere is turned equatorially until the deep socket at that portion of a meridian groove which is indicated herein at 5 registers with the opening 2, when the parts will be in position to permit the coupling member $b'$ to be slipped into place in substantially the manner just described with respect to the other coupling member $b$. It will be clear by referring to Fig. 7 that this bearing member $b'$ can be slipped onto the corresponding journal-surface of the sphere C only when the two coupling-heads H and H' are disposed substantially at right angles with respect to each other. The use of the recess 2 will now be apparent, as it will be seen that if the sphere were turned equatorially to bring the shallow portion of the meridian groove into registration with said recess 2 the clear opening would not be sufficiently large to permit the introduction of one end of the divided bearing member $b'$, and hence the latter could not be assembled with the other members. The arms of the divided bearings are practically rigid, but are sufficiently yielding or resilient to spread slightly when the spherical socket is pressed into place from the position shown in Fig. 6 to its assembled position, and hence just as the point of the proper journal-surface—such, for example, as the point 6—passes by the corresponding point, such as the point 7, of the bearing member the latter will slip over the point 6 and snap back to its original position.

My improved universal joint or coupling constitutes a very simple and efficient device of this type and is practically a unitary structure, as there are no spaces formed by cutaway portions except the spaces formed by the shallow concave grooves $r$ and $r'$, and hence the original mass and strength of the spherical journal member are almost entirely retained, a matter which is of very great importance when abnormal strains are brought to bear upon the coupling.

Having described my invention, I claim—

1. In a universal joint, the combination, with a coupling-head having a divided bearing member, of a journal-center having a meridian groove the back wall of which forms a journal-surface and is defined by a circle of greater diameter than the width of the opening at the divided end of the bearing member, said journal-center having a recess in such journal-surface of a depth sufficient to permit the insertion of the journal-center between the divided ends of the bearing member.

2. In a universal joint, the combination, with a coupling-head having a divided bearing member, of a journal-center having a meridian groove the back wall of which forms a journal-surface and is defined by a circle of greater diameter than the width of the opening at the divided end of the bearing member, said journal-center having one concavity only in such journal-surface and of a depth sufficient to permit the insertion of the journal member between the divided ends of the bearing member.

3. A universal joint comprising a pair of coupling-heads each having a divided bearing member, and a spherical center having meridian grooves crossing on its polar centers, each of said meridian grooves having a back wall forming a journal-surface defined by a circle of greater diameter than the width of the opening at the divided end of its respective bearing member, said spherical center also having a pair of diametrically opposite concave grooves disposed transversely to each other and located, respectively, in such back walls of said respective meridian grooves, and each of a depth sufficient to permit the insertion of the spherical center in the divided end of the corresponding bearing member.

FRANCIS H. RICHARDS.

Witnesses:
F. N. CHASE,
FRED. J. DOLE.